(12) United States Patent
Block et al.

(10) Patent No.: US 10,013,318 B2
(45) Date of Patent: Jul. 3, 2018

(54) DISTRIBUTED EVENT CORRELATION SYSTEM

(71) Applicant: HEWLETT-PACKARD DEVELOPMENT COMPANY, L.P., Houston, TX (US)

(72) Inventors: Robert Block, Sunnyvale, CA (US); Anurag Singla, Sunnyvale, CA (US)

(73) Assignee: EntIT Software LLC, Sunnyvale, CA (US)

( * ) Notice: Subject to any disclaimer, the term of this patent is extended or adjusted under 35 U.S.C. 154(b) by 87 days.

(21) Appl. No.: 14/783,175

(22) PCT Filed: Apr. 16, 2013

(86) PCT No.: PCT/US2013/036796
§ 371 (c)(1),
(2) Date: Oct. 8, 2015

(87) PCT Pub. No.: WO2014/171926
PCT Pub. Date: Oct. 23, 2014

(65) Prior Publication Data
US 2016/0034361 A1     Feb. 4, 2016

(51) Int. Cl.
*G06F 11/00* (2006.01)
*G06F 11/20* (2006.01)
(Continued)

(52) U.S. Cl.
CPC ........ *G06F 11/2002* (2013.01); *G06F 11/079* (2013.01); *G06F 11/0709* (2013.01);
(Continued)

(58) Field of Classification Search
CPC ............. G06F 11/2002; G06F 11/0709; G06F 11/079; G06F 11/2046; G06F 11/2097;
(Continued)

(56) References Cited

U.S. PATENT DOCUMENTS 5,805,785 A    9/1998  Dias et al.
6,298,378 B1  10/2001  Angal et al.
(Continued)

FOREIGN PATENT DOCUMENTS

CN    102104869    6/2011
CN    102426545    4/2012
(Continued)

OTHER PUBLICATIONS

"Vision Paper Distributed Data Mining and Big Data: Intel's Perspective on Data at the Edge", Intel IT Center, Aug. 2012. <http://www.oracle.com/events/emea/en/oracleday2012/intel-vision-paper-1878780.pdf>.

(Continued)

*Primary Examiner* — Joseph D Manoskey

(57) ABSTRACT

According to an example, a master node is to divide an event field in events into partitions including ordered contiguous blocks of values for the event field. Each partition may be assigned to a pair of cluster nodes. A partition map is determined from the partitions and may identify for each partition, the block of the event field values for the partition, a primary cluster node, and a failover cluster node for the primary cluster node.

19 Claims, 8 Drawing Sheets

(51) Int. Cl.
  *H04L 29/06* (2006.01)
  *G06F 21/55* (2013.01)
  *H04L 12/24* (2006.01)
  *G06F 11/07* (2006.01)
  *G06F 17/40* (2006.01)

(52) U.S. Cl.
  CPC .......... *G06F 21/554* (2013.01); *H04L 41/065* (2013.01); *H04L 41/0659* (2013.01); *H04L 41/0686* (2013.01); *H04L 63/1416* (2013.01); *G06F 11/2046* (2013.01); *G06F 11/2097* (2013.01); *G06F 17/40* (2013.01); *G06F 2201/805* (2013.01)

(58) Field of Classification Search
  CPC ............. G06F 11/2025; G06F 11/2028; G06F 21/554; G06F 17/40; G06F 2201/805; H04L 41/065; H04L 41/0659; H04L 41/0686; H04L 63/1416
  USPC .................................................. 714/4.11, 13
  See application file for complete search history.

(56) References Cited

U.S. PATENT DOCUMENTS

| | | | |
|---|---|---|---|
| 6,728,897 B1 | 4/2004 | Cramer et al. | |
| 7,831,705 B1* | 11/2010 | Agbabian | H04L 63/1425 709/224 |
| 7,937,616 B2* | 5/2011 | Armstrong | G06F 11/2033 714/10 |
| 2004/0059805 A1 | 3/2004 | Dinker et al. | |
| 2004/0098359 A1 | 5/2004 | Bayliss et al. | |
| 2004/0199486 A1 | 10/2004 | Gopinath et al. | |
| 2008/0027920 A1 | 1/2008 | Schipunov et al. | |
| 2008/0126853 A1* | 5/2008 | Callaway | G06F 11/1641 714/13 |
| 2008/0177741 A1 | 7/2008 | Vikram et al. | |
| 2008/0301175 A1* | 12/2008 | Applebaum | G06F 17/3051 |
| 2009/0222543 A1 | 9/2009 | Tannenbaum et al. | |
| 2010/0153481 A1* | 6/2010 | Ginkel | G06F 15/16 709/201 |
| 2012/0254416 A1 | 10/2012 | Fake et al. | |

FOREIGN PATENT DOCUMENTS

| | | |
|---|---|---|
| CN | 102945139 | 2/2013 |
| WO | WO-2013019198 | 2/2013 |
| WO | WO-2013/032911 A1 | 3/2013 |

OTHER PUBLICATIONS

International Search Report & Written Opinion, dated Jan. 28, 2014, PCT Patent Application No. PCT/US2013/036796, 9 pages.
Reguieg, Hicham, et al. "Using Mapreduce to scale events correlation discovery for business processes mining", HP Laboratories, Aug. 7, 2012. <http://www.hpl.hp.com/techreports/2012/HPL-2012-170.pd >.
Jeffrey Dean and Sanjay Ghemawat, "MapReduce: Simplified Data Processing on Large Clusters," Communications of the ACM, Jan. 2008, pp. 107-113, vol. 51, No. 1, ACM.
Supplementary Partial European Search Report, EP Application No. 13882517.9, dated Dec. 5, 2016, pp. 1-9, EPO.
Jeffrey Dean, Sanjay Ghemawat, "MapReduce: Simplified Data Processing on Large Clusters"; Communications of the ACM, Jan. 2008; 7 pages.
Chinese Office Action dated May 3, 2017 in Chinese Patent Application26 No. 2013/80075693.4, 9 pages.
European Office Action dated Apr. 3, 2017 in European Patent Application No. 13882517.9, 17 pages.

* cited by examiner

DISTRIBUTED EVENT CORRELATION SYSTEM

BACKGROUND

Computer networks and systems have become indispensable tools for modern business. Today terabits of information on virtually every subject imaginable are stored and accessed across networks. In some cases, events in the data are analyzed possibly in real-time to make decisions. Large amounts of data received in continuous data streams may be stored and analyzed to make decisions about the events.

BRIEF DESCRIPTION OF DRAWINGS

The embodiments are described in detail in the following description with reference to examples shown in the following figures.

DETAILED DESCRIPTION OF EMBODIMENTS

Figure 1:
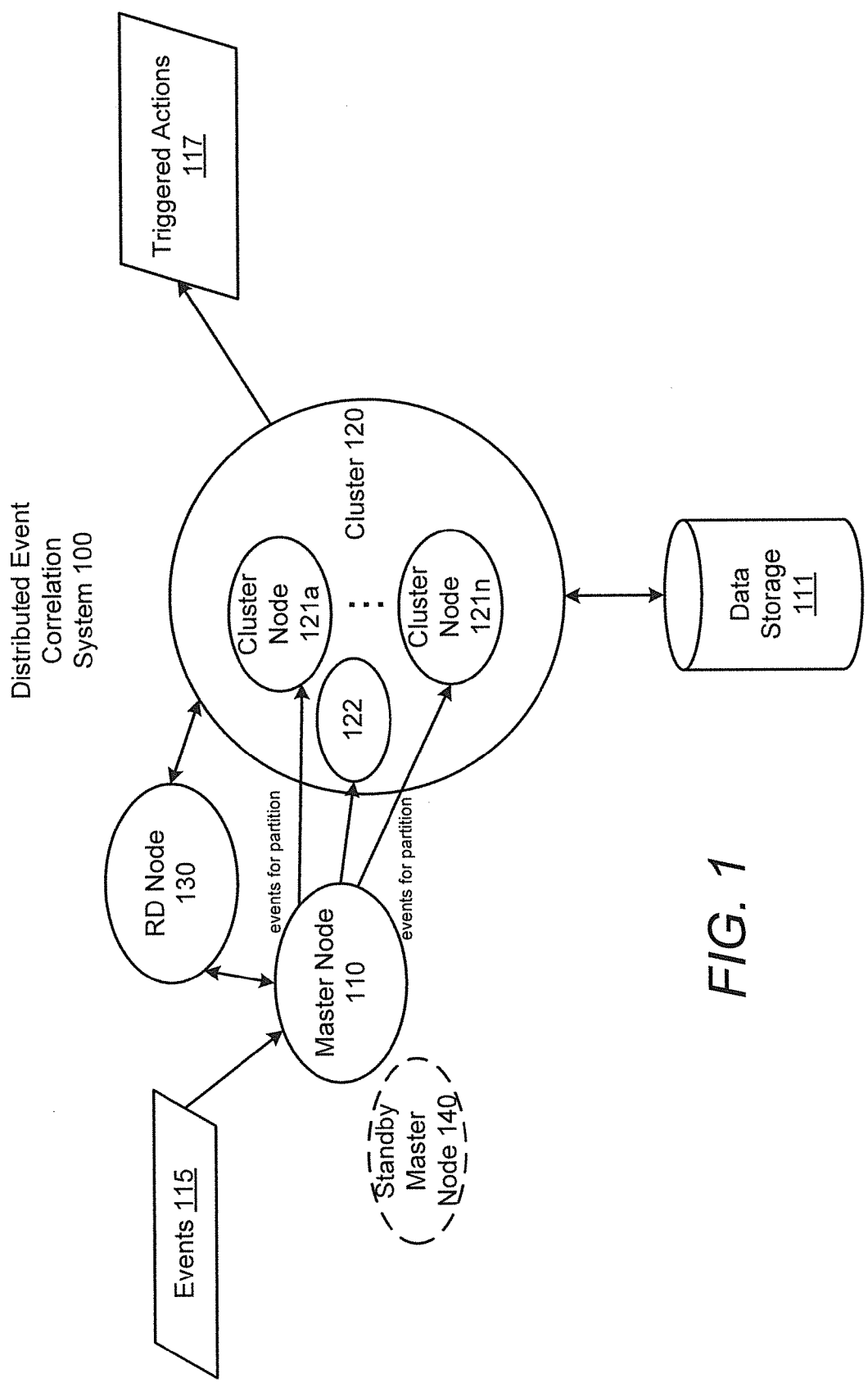
FIG. 1 illustrates an example of a distributed event correlation system.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

A distributed event correlation system according to an example may correlate events. The data containing the events stored in the distributed event correlation system may be generated by one or more devices. The amount of data containing the events may continue to grow as new data is received from the devices.

A cluster of nodes in the distributed event correlation system may store the data containing the events and can perform compute-intensive correlation on the events. Rules including conditions may be stored to correlate the events. The distributed event correlation system can apply the rules to the events to detect certain types of activities and perform certain functions in response to detecting the activities.

The distributed event correlation system can implement a dynamic data partitioning scheme of the event data across the cluster of nodes and can route incoming events to a node that contains related data for efficient event correlation. The distributed event correlation system can also implement a distributed checkpoint and recovery function that allows the cluster to survive any single point of failure with rapid failover.

An event may include an activity, such as an action. The activity may occur or be performed on a computer and/or in a computer network. Event data for events may include any data describing and/or otherwise related to an activity performed on a computer or in a computer network. The event data may be correlated and analyzed by the distributed event correlation system to detect certain conditions and to trigger certain actions including alerts or other actions.

In one example, the event data may be correlated and analyzed by the distributed event correlation system to identify network or computer security threats. The activities detected through event correlation may be malicious activities such as attempts to gain unauthorized access to a computer network or a computer system. The activities of the events may be associated with a user, also referred to as an actor, to identify a security threat and the cause of the security threat. Activities may include logins, logouts, sending data over a network, sending emails, accessing applications, reading or writing data, etc. A security threat may include activities determined to be indicative of suspicious or inappropriate behavior, which may be performed over a network or on systems connected to a network. For example, correlation may include detecting failed login attempts from the same user across multiple different machines within a 5 minute time period.

The data sources for the event data may include network devices, applications or other types of data sources described below operable to provide event data that may be used to identify network security threats. Event data describing events may be captured in logs or messages generated by the data sources. For example, intrusion detection systems, intrusion prevention systems, vulnerability assessment tools, firewalls, anti-virus tools, anti-spam tools, and encryption tools may generate logs describing activities performed by the source. Event data may be provided, for example, by entries in a log file or a syslog server, alerts, alarms, network packets, emails, or notification pages.

Event data can include information about the device or application that generated the event. An identifier for an event source may be a network endpoint identifier (e.g., an Internet Protocol (IP) address or Media Access Control (MAC) address) and/or a description of the source, possibly including information about the product's vendor and version. The time attributes, source information and other information is used to correlate events with a user and analyze events for security threats.

The event correlation is not limited to detecting network security threats and can be applied to many different applications. For example, transactions for online purchases may be correlated to detect certain conditions or bank financial transaction can be correlated to detect certain conditions. The event correlation can be applied to applications that receive large amounts of data that is to be correlated in real time to detect certain conditions in order to perform certain actions. The activities that can be detected are not limited to malicious activities and can be any type of activities that can be detected through application of rules to events.

FIG. 1 illustrates an example of a distributed event correlation system 100. The distributed event correlation system 100 may include a master node 110 operating as a control center for a cluster 120 including cluster nodes 121a-n. A node may include a computer platform including at least one processor and data storage. The storage may include memory and/or other types of data storage. The cluster 120 is a group of nodes, such as cluster nodes 121a-n, storing partitioned event data, and independent cluster node 122. The master node 110 may manage the cluster membership, create and maintain a partition map identifying a partition of events stored in each cluster node, receive incoming event data including events, and route the event data for each event to the cluster node storing the partition corresponding to the event. Event data may be partitioned across a field in the event data, such as user ID, device ID, event time, etc. For example, a financial application may have a very large transaction data set that can be partitioned by customer-id, so blocks of customer IDs can be assigned to each of the cluster nodes 121a-n. Incoming transaction events have a customer-id encoded in one of the event fields. The event data is stored across the cluster nodes 121a-n according to the customer IDs assigned to each cluster node, and each cluster node may correlate events according to rules.

The cluster 120 may include the independent cluster node 122, which correlates events that have no data relevant to a partition, such as an event without a customer ID. Rule designated (RD) node 130 may store rules for correlating events that span across data partitions. The distributed event correlation system 100 may include a standby master node 140, which maintains a backup of the master node's control data and can take over if the master node fails.

Data storage 111 may include a database, an online analytical data storage system or another type of data storage system. The data storage 111 may include hardware, such as hard drives, memory, processing circuits, etc., for storing data and executing data storage and retrieval operations. The data storage 111 may store any information used by the distributed event correlation system 100. The data storage 111 may store all received event data, both partitioned and non-partitioned.

The distributed event correlation system 100 may receive events 115 from one or more sources. The events 115 may include event data including information about the events 115. The events 115 are stored in the data storage 111. Also, the master node 110 forwards events for each partition to the corresponding cluster node for storage. For example, cluster node 121a stores all events having a customer ID from 1-10,000, cluster node 121b stores all events having a customer ID from 10,001 to 11,000 and so on. Each cluster node may correlate events according to one or more rules provided by the RD nodes 130a-d. Correlation may include applying rules to the events 115 forwarded to the cluster node to detect certain activities which may trigger actions 117, such as alerts, notifications, reports, further analysis of events, etc., in response to detection of the activities.

The cluster nodes 121a-n represent that the cluster 120 includes multiple nodes. The number of nodes can vary over time and may vary based on amount of data to be stored and correlated. Also, the RD node 130 may comprise one or more nodes. Also, the master node 110 may manage multiple clusters. Also, the RD node 130 and the data storage 111 are shown connected to the cluster 120 to indicate that the RD node 130 and the data storage 111 may be connected to any cluster nodes in the cluster 120. Also, each of the cluster nodes 121a-n and 122 may prompt execution of the trigger actions 117.

Figure 2:
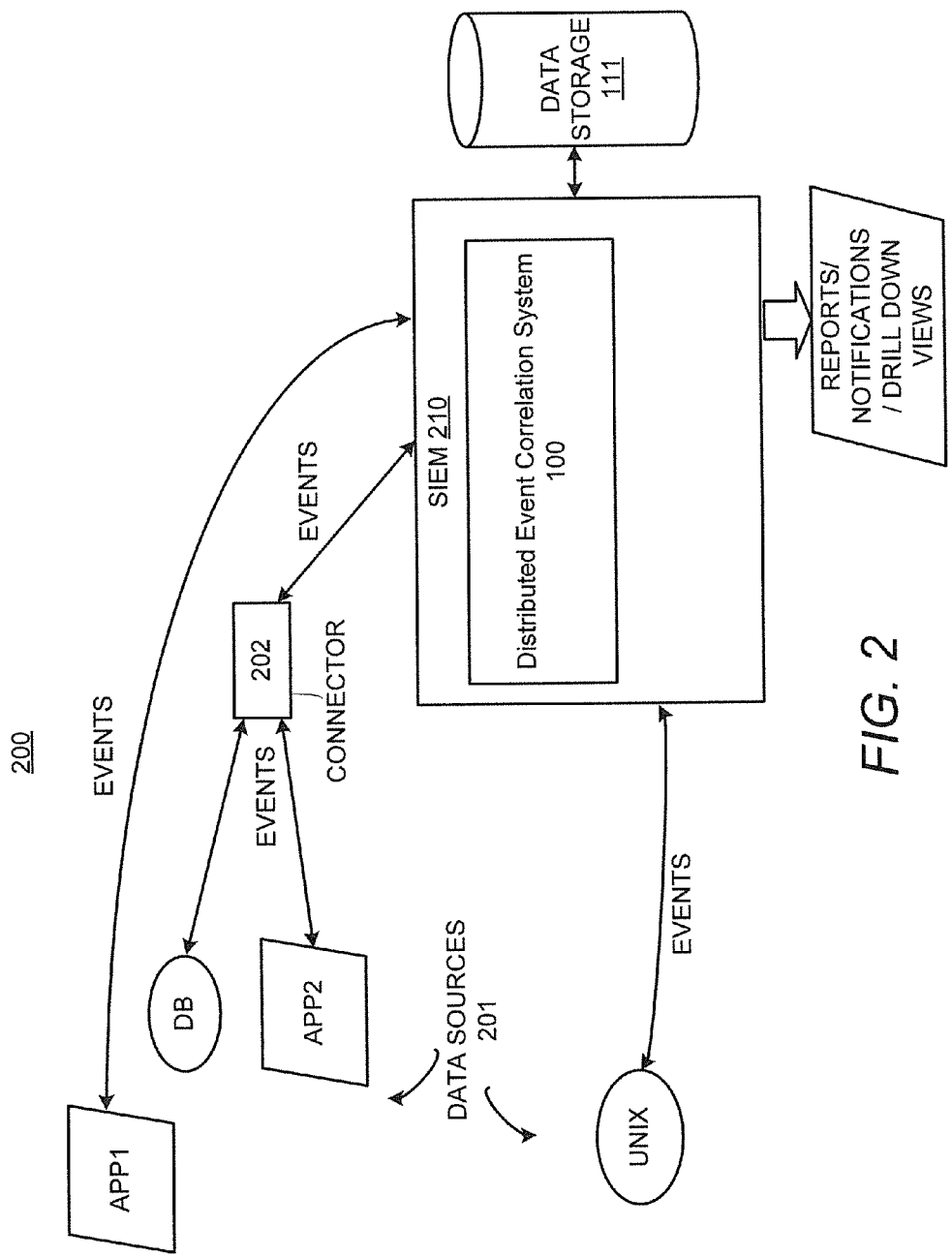
FIG. 2 illustrates an example of a security information and event management system.

FIG. 2 illustrates a security information and event management system (SIEM) environment 210, according to an example. The distributed event correlation system 100 shown in FIG. 1 may be used in the SIEM 210 to process event data, which may include real-time event processing. The SIEM 210 may process the event data to determine network-related conditions, such as network security threats. Also, the SIEM 210 is described as a security information and event management system by way of example.

Data sources 201 generate event data for events, which are collected by the SIEM 210 and stored in the data storage 111. The data sources 201 may include network devices, applications or other types of data sources operable to provide event data that may be analyzed. Event data may be captured in logs or messages generated by the data sources 201. The data sources, for example, may include network switches, intrusion prevention systems (IPSs), vulnerability assessment tools, anti-virus tools, anti-spam tools, encryption tools, and business applications. Event data is retrieved for example from data source logs and stored in the data storage 111. Event data may be provided, for example, by entries in a log file or a syslog server, alerts, alarms, network packets, emails, or notification pages. The data sources 201 may send messages to the SIEM 210 including event data.

Event data can include event fields for information about the source that generated the event and information describing the event. For example, the event data may identify the event as a user login. Other event fields in the event data may include when the event was received from the event source ("receipt time"). The receipt time is a date/time stamp. The event fields may describe the source, such as an event source is a network endpoint identifier (e.g., an IP address or MAC address) and/or a description of the source, possibly including information about the product's vendor and version. The date/time stamp, source information and other information may then be used for correlation performed by the distributed event correlation system 100. The event fields may include meta data for the event, such as when it took place, where it took place, the user involved, etc.

Examples of the data sources 201 are shown in FIG. 1 as Database (DB), UNIX, App1 and App2. DB and UNIX are systems that include network devices, such as servers, and generate event data. App1 and App2 are applications that generate event data. App1 and App2 may be business applications, such as financial applications for credit card and stock transactions, information technology applications, human resource applications, or any other type of application.

Other examples of data sources 201 may include security detection and proxy systems, access and policy controls, core service logs and log consolidators, network hardware, encryption devices, and physical security. Examples of security detection and proxy systems include IDSs, IPSs, multipurpose security appliances, vulnerability assessment and management, anti-virus, honeypots, threat response technology, and network monitoring. Examples of access and policy control systems include access and identity management, virtual private networks (VPNs), caching engines, firewalls, and security policy management. Examples of core service logs and log consolidators include operating system logs, database audit logs, application logs, log consolidators, web server logs, and management consoles. Examples of network devices include routers and switches. Examples of encryption devices include data security and integrity. Examples of physical security systems include card-key readers, biometrics, burglar alarms, and fire alarms. Other data sources may include data sources that are unrelated to network security.

The connector 202 may include code comprised of machine readable instructions that provide event data from a data source to the SIEM 210. The connector 202 may provide efficient, real-time (or near real-time) local event data capture and filtering from one or more of the data sources 201. The connector 202, for example, collects event data from event logs or messages. The collection of event data is shown as "EVENTS" describing event data from the data sources 201 that is sent to the SIEM 210. Connectors may not be used for all the data sources 201.

The master node 110 in the distributed event correlation system 100 may receive the event data from the data sources 201 and store events in the data storage 111 and the cluster 120. The cluster nodes 121a-n of the distributed event correlation system 100 can correlate the events for example based on rules provided by the RD node 130 of the distributed event correlation system 100. Correlation includes, for example, discovering the relationships between events, inferring the significance of those relationships, e.g., by generating meta events, prioritizing the events and meta events, and providing a framework for taking action. The SIEM 210 also supports response management, ad-hoc query resolution, reporting and replay for forensic analysis, and graphical visualization of network threats and activity.

The cluster nodes 121a-n examine received events to determine which (if any) of the various rules being processed in the SIEM 210 may be implicated by a particular event or events. A rule is considered to be implicated if an event under test has one or more attributes that satisfy, or potentially could satisfy, one or more rules. For example, a rule can be considered implicated if the event under test has a particular source address from a particular subnet that meets conditions of the rule. Events may remain of interest in this sense for designated time intervals associated with the rules and so by knowing these time windows events can be stored and discarded as warranted. The SIEM 210 may communicate or displaying reports or notifications about events and event processing to users.

Figure 3:
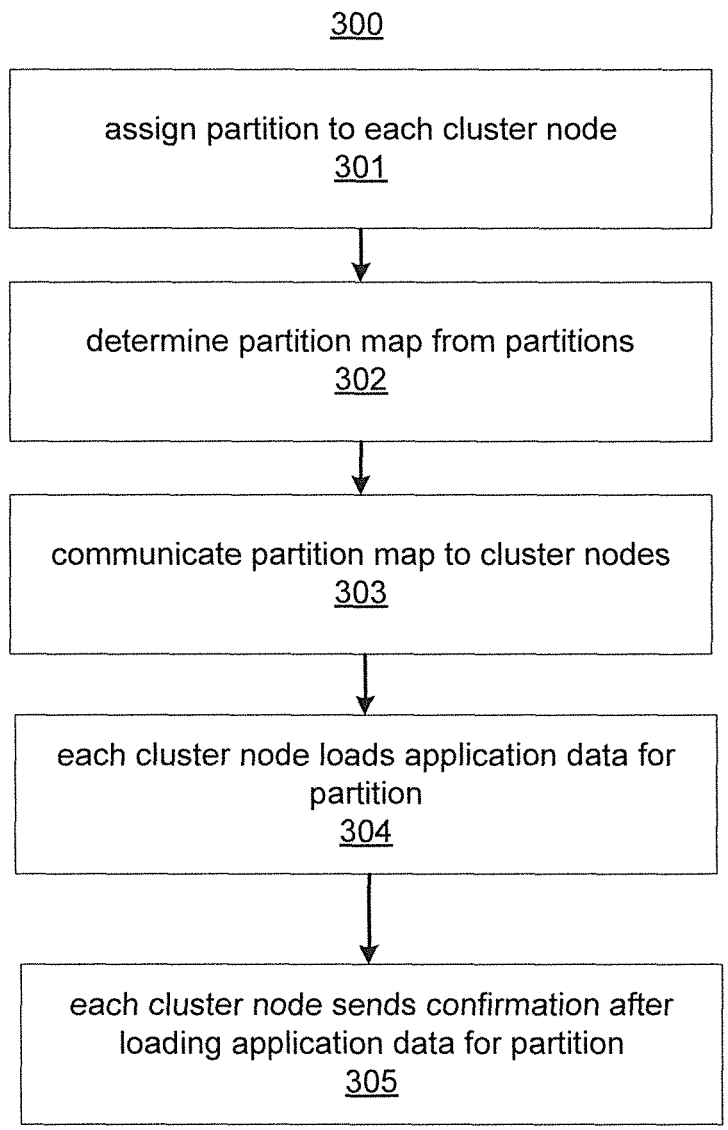
FIG. 3 illustrates an example of a method for creating a cluster.

Examples of interactions between the components in the distributed event correlation system 100 shown in FIG. 1 are now described with respect to methods. Method 300 shown in FIG. 3 describes creating the cluster 120.

At 301, the master node 110 assigns a partition to each cluster node. For example, the master node 110 divides one or more fields in the events (e.g., customer-id) into ordered contiguous blocks and assigns each block to a pair of cluster nodes. The pair may include a primary cluster node and a failover cluster node. For example, cluster node 121a may be a primary cluster node for a block of events and may be a failover node for another block of events. The block assignment may spread the events evenly across the cluster nodes 121a-n and that for each cluster node, the block assignment distributes the events evenly over the failover nodes. The latter property guarantees that the data load remains balanced after any node failure.

Also, at 301, the master node 110 may wait until the cluster 120 reaches a stable state to determine the partitions. A stable state for example includes when a predetermined number of cluster nodes are available for the cluster 120.

At 302, the master node 110 determines a partition map from the partitions. The partition map may identify for each partition, the block of the event field values for the partition, a primary cluster node, and a failover cluster node for the primary cluster node. The partition map may include a list of tuples, such as {dim_start_value, dim_end_value, primary_node, failover_node}. A tuple is provided for each partition. Dim_start_value is dimension start value and dim_end_value is dimension end value, such as 0 and 10,000 respectively for customer ID. Dimension for example refers to a field in an event, and the values 0 and 10,000 are examples of a start event field value and an end event field value for customer ID. The values 0-10,000 represent the range of event field values for a partition.

At 303, the master node 110 may communicate the partition map to all the cluster nodes 121a-n. The partition map may be stored in the master node 110, each of the cluster nodes 121a-n and the data storage 111.

At 304, each of the cluster nodes 121a-n loads application data for its assigned partition into its data storage, e.g., memory, from the data storage 111. The application data may include any data related to event data that may be used for correlating events based on event correlation rules. One example of application data may be information related to aggregated events, such as historic purchase data for a customer that spans over multiple days, months or years. In another example, the application data may include a trusted list of source IP addresses or a hostile list of source IP addresses that previously attempted to gain unauthorized access to a network. The application data can be used for event correlation. For example, a correlation rule may include determining whether a source IP addresses is on a hostile list if a predetermined number of failed login attempts occurred within a certain time period, and triggering an alert if one or more of the failed login attempts has a source IP address on the hostile list. Each cluster node loads the application data for its partition, such as for its customer range if the partitioning is by customer ID, in its memory. That way, when a cluster node receives an event with a corresponding customer id, it can process the partitioned rules efficiently with all relevant data in memory.

At 305, each of the cluster nodes 121a-n sends a confirmation to the master node 110 indicated it loaded its application data. After the master node 110 has received confirmation from all the cluster nodes 121a-n, the master node 110 begins accepting and routing incoming events to the cluster nodes 121a-n.

If multiple RD nodes are used in the distributed event correlation system 100, the master node 110 may assign each of the cluster nodes 121a-n to one of the RD nodes. The RD node assignment is communicated to the cluster nodes 121a-n.

Figure 4:
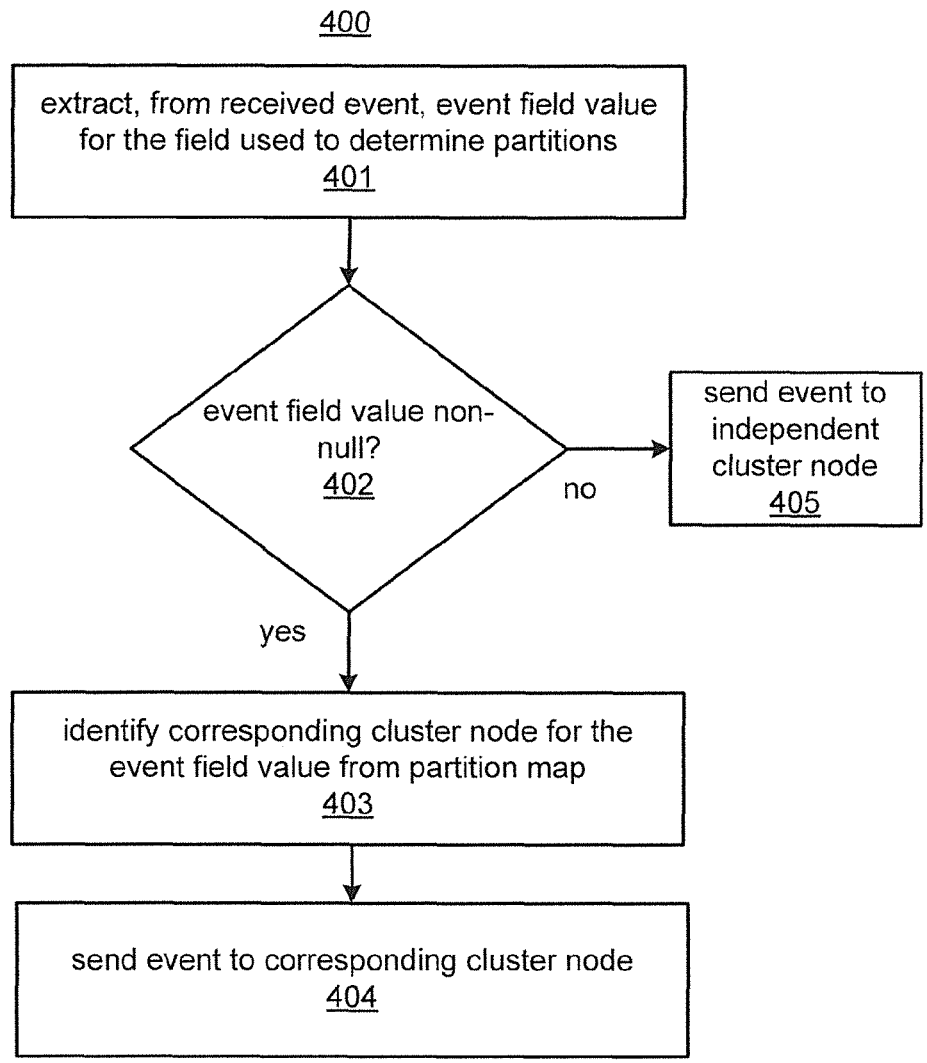
FIG. 4 illustrates an example of a method for routing events to cluster nodes.

Method 400 shown in FIG. 4 describes routing incoming events to the cluster nodes 121a-n and 122. At 401, the master node 110 extracts, from a received event, an event field value for the field that is used to determine the partitions. The event may be an incoming event coming from an external data source, such as one of the data sources 201 shown in FIG. 2. The dimension may be a field by which the event data is partitioned. The event field value may be a value in the field.

At 402, the master node 110 determines if the event field value is non-null. A null value may mean there is no value in the event field or there is an improper value in the event field, such as a string instead of an integer or a value that is out of a predetermined range. If the event field value is non-null, the master node 110 identifies the corresponding cluster node for the event field value from the partition map at 403. For example, if the event field value is 9000 for customer ID, the master node 110 identifies that cluster node 121a stores events for customer ID values 0-10,000 from the partition map. At 404, the master node 110 sends the event to the corresponding cluster node determined from the event field value and the partition map and the master node 110 also sends the event to the data storage 111. The cluster node may correlate events according to a rule.

At 405, if the event field value is null or is not in any of the partitions, the master node 110 sends the event to the independent cluster node 122 and to the data storage 111. The independent cluster node 122 may correlate received events according to a rule.

Figure 5:
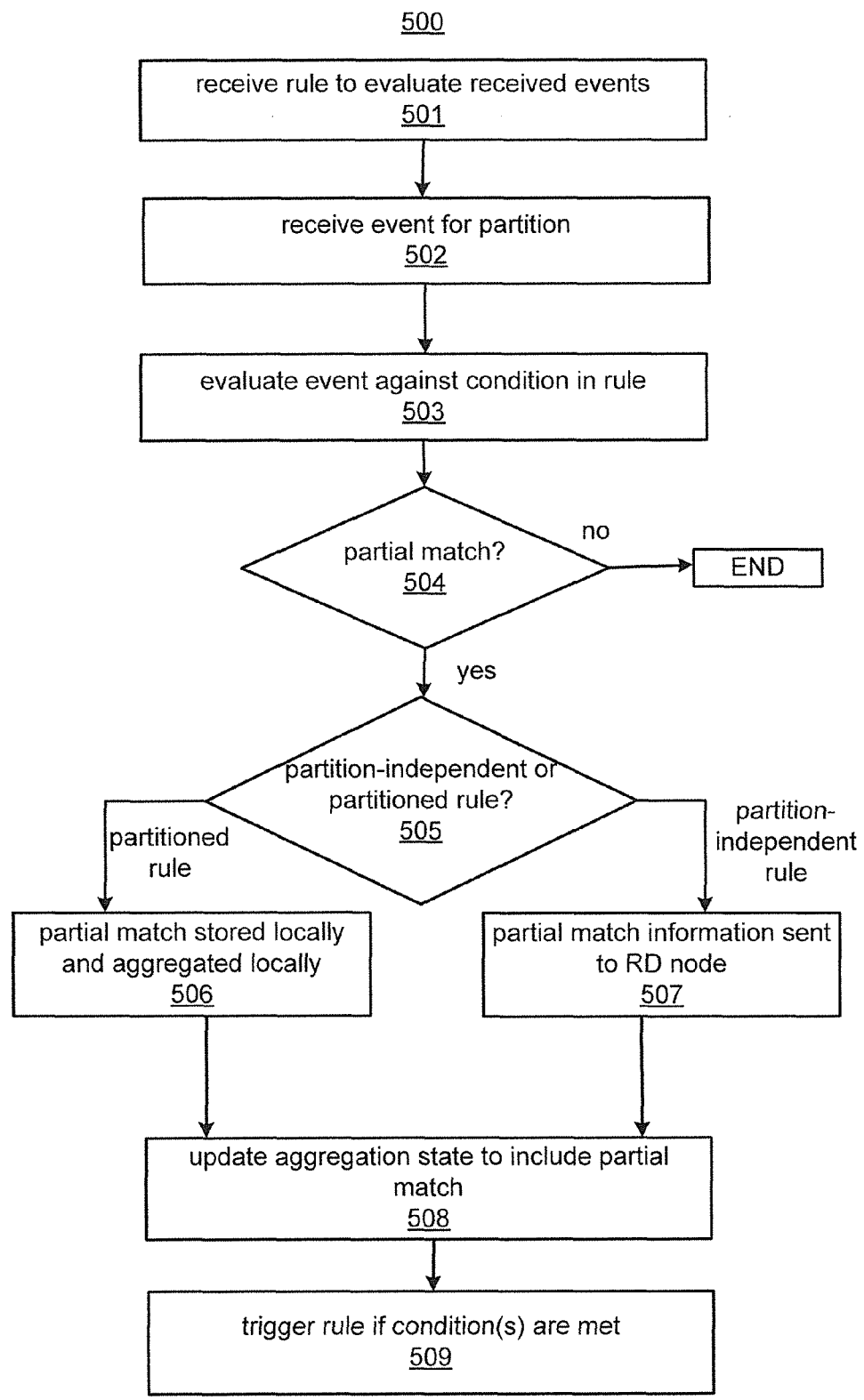
FIG. 5 illustrates an example of a method for event matching to rule conditions.

Method 500 shown in FIG. 5 describes event matching to rule conditions for event correlation. At 501, the cluster nodes 121a-n and 122 receive a rule or multiple rules. The rules may be stored in the data storage 111 and loaded into the cluster nodes 121a-n and 122. Rules including conditions may be received and stored to correlate the events. The cluster nodes 121a-n and 122 can determine whether conditions for a rule are met to trigger actions indicated in the rule.

In one example, all of the rules for correlating events, partitioned or otherwise, may be deployed across all the cluster nodes and any changes to the rules may be synchronized across all the nodes. These rules are also referred to as correlation rules. For a partitioned rule, each cluster node executes the same rules, but using different sets of event data that correspond to its partition. A rule executed for partitioned events is referred to as a partitioned rule and may include a condition or action that is triggered based on events for a partition. For example, cluster nodes 121a-n may be partitioned by subnet of the source IP address. A rule may include triggers or actions applicable to a particular subnet. For example, some subnets may require higher security than other subnets because they have access to confidential data or more sensitive data. A rule for one subnet having sensitive data may indicate that if 5 failed login attempts from a user within a 5 minute period are detected for one or more computers on the subnet, then trigger an alert and disable the user ID. A rule for another subnet may include that if 10 failed login attempts from a user are detected within a 10 minute period on the subnet, then trigger an alert to the system administrator to contact the user. The same partitioned rule may be executed by all the cluster nodes, but if the conditions do not apply to their partition, then the action is not triggered. A global rule that includes conditions independent of any particular partition and is applicable to all partitions or multiple partitions is referred to as a partition-independent rule. An example of a partition-independent rule for the subnet dimension is that if 10 failed login attempts from a user are detected within a 10 minute period, then trigger an alert to the system administrator to contact the user. A partial match may be found on different subnets so the rule is partition-independent.

Events may be aggregated for some rules to determine whether conditions for the rules are met. For example, a rule includes a condition to detect 5 failed login attempts within a 5 minute time period. Events that are determined to be a partial match (e.g., events that indicate failed login attempts) for example by a cluster node are aggregated to determine whether 5 failed login attempts within a 5 minute time period have occurred. Events may be aggregated at the cluster node or sent to the RD node 130 for aggregation to determine whether the conditions for the rule are met. If the rule is a global rule, then the partial matching events are sent to the RD node 130 from the cluster nodes 121a-n and 122 detecting a partial match, so the RD node 130 can detect whether the rule conditions are met based on events for multiple partitions.

At 502, a cluster node receives an event for its partition and stores it. The event may be received from the master node 110 such as described in the method 400.

At 503, the cluster node evaluates the event against a condition in a rule received at 501. For example, events are aggregated to determine whether one or more conditions in the rule are met.

At 504, the cluster node determines whether the event is a partial match for the rule. Determining whether the event is a partial match for example includes determining whether a condition is partially met by the event, such as whether the event identifies a failed login attempt for a rule that has a condition of detecting 5 failed login attempts.

At 505, if the event is a partial match, the cluster node determines whether the rule is a partition-independent rule or a partitioned rule. At 506, if the rule is a partitioned rule, the event is stored locally as a partial match and aggregated locally at the cluster node. If the rule is a partition-independent rule, at 507, information for the partial match, which may include the entire event or a subset of event fields in the event field that are relevant to the condition matching, is forwarded to the RD node 130. The RD node 130 may determine whether the aggregated partial matches satisfy the condition of the rule to trigger an action that may be specified in the rule. Partial match information may be queued up and sent in batches to the RD node 130. If there are multiple RD nodes, each assigned to one or more cluster nodes, then the cluster node sends the partial match information to the corresponding RD node. Also, at 506, partial matches may be sent to the RD node 130.

At 508, an aggregation state is updated to include a partial match. The cluster node and the RD node 130 maintain the aggregation state of a rule based on partial matches. The aggregation state may include information for the partial matches for a rule. For example, if the rule's conditions include detection of 5 failed login attempts within a 5 minute time period for one user, the aggregation state includes event fields for the partial matches that are relevant to the conditions of the rule, such as user ID, event time, and description of event. To facilitate recovery from single node failures, the aggregation state is shared with failover nodes. For example, each cluster node may have a failover node for its partition. Each primary cluster node shares the aggregation state with its failover node. For example, each primary cluster node creates a checkpoint containing a snapshot of its state, including the aggregation state, and sends the checkpoint to the designated failover node. The checkpoint data may be written to the local file system as well, to recover from a larger system failure. The checkpoint may include the aggregation state and events recently received from the master node 110. The RD node 130 may also have a failover node and the RD node 130 can create and send a checkpoint to its failover node. Checkpoints may be sent periodically to the failover nodes.

At 509, if the condition or multiple conditions, e.g., when multiple conditions are specified for the rule, are met based on partial matches, an action for the rule is triggered. For example, the rule is a partitioned rule, such as if 5 failed login attempts from a user within a 5 minute period for one or more computers on the subnet for the partition are detected, then trigger an alert and disable the user ID. The cluster node for the partition may aggregate the partial matches to determine whether 5 login attempts within a 5 minute period for the user are detected based on received events and aggregating partial matches for received events. The cluster node may trigger the actions if the conditions are met. If the rule is a partition-independent rule, then the RD node 130 receives the partial match information and determine whether the conditions are met to trigger the action.

Figure 6:
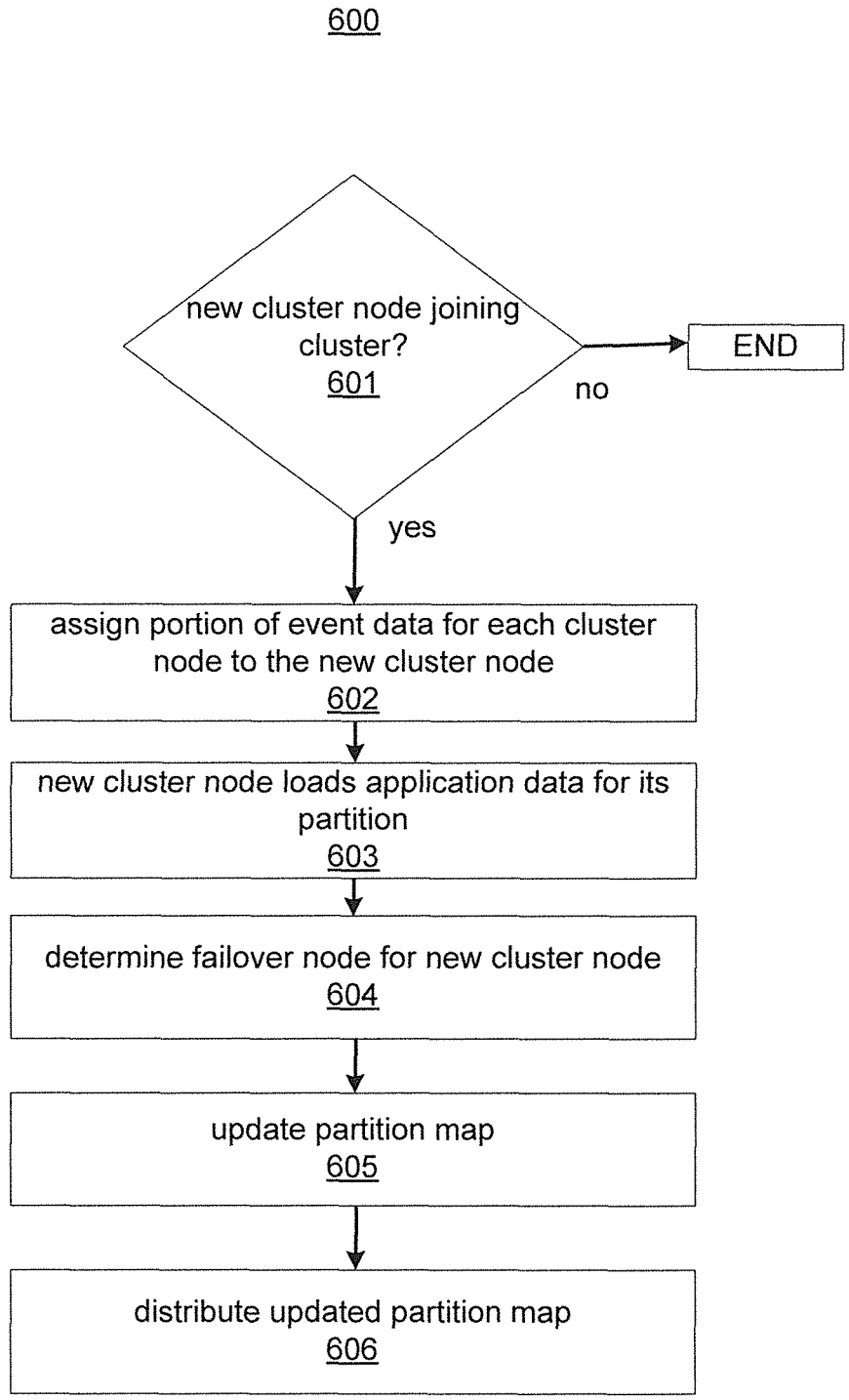
FIG. 6 illustrates an example of a method for modifying a cluster to include a new cluster node.

Method 600 shown in FIG. 6 describes modifying cluster membership to include a new cluster node. At 601, the master node 110 determines whether a new cluster node is joining the cluster 120. For example, the master node 110 may receive a message from a cluster node requesting to join the cluster 120.

At 602, if the master node 110 determines the new cluster node is joining the cluster, the master node 110 assigns a portion of event data for each of the cluster nodes 121a-n to the new cluster node. The assigning for example is the partitioning across an event field. The new cluster node loads application data for its partition from the data storage 111 at 603. At 604, a failover node is determined for the new cluster node, and the failover node loads the application data for the new cluster node.

The master node 110 updates the partition map to identify the new cluster node and its partition and its failover node at 605, and the master node 110 distributes the updated partition map to the cluster nodes 121*a-n* and the new cluster node at 606. Updating the partition map may include updating any changes to the partitions as a result of the shifting of the portion of the contiguous blocks of event field values to the new cluster node.

In one example, at 602, the master node 110 determines new partitions based on the same partition event field as the previous partition map across all the cluster nodes, including the new cluster node. The block assignment for the new partition map may spread the events evenly across the cluster nodes, including the new cluster node for load balancing.

Figure 7:
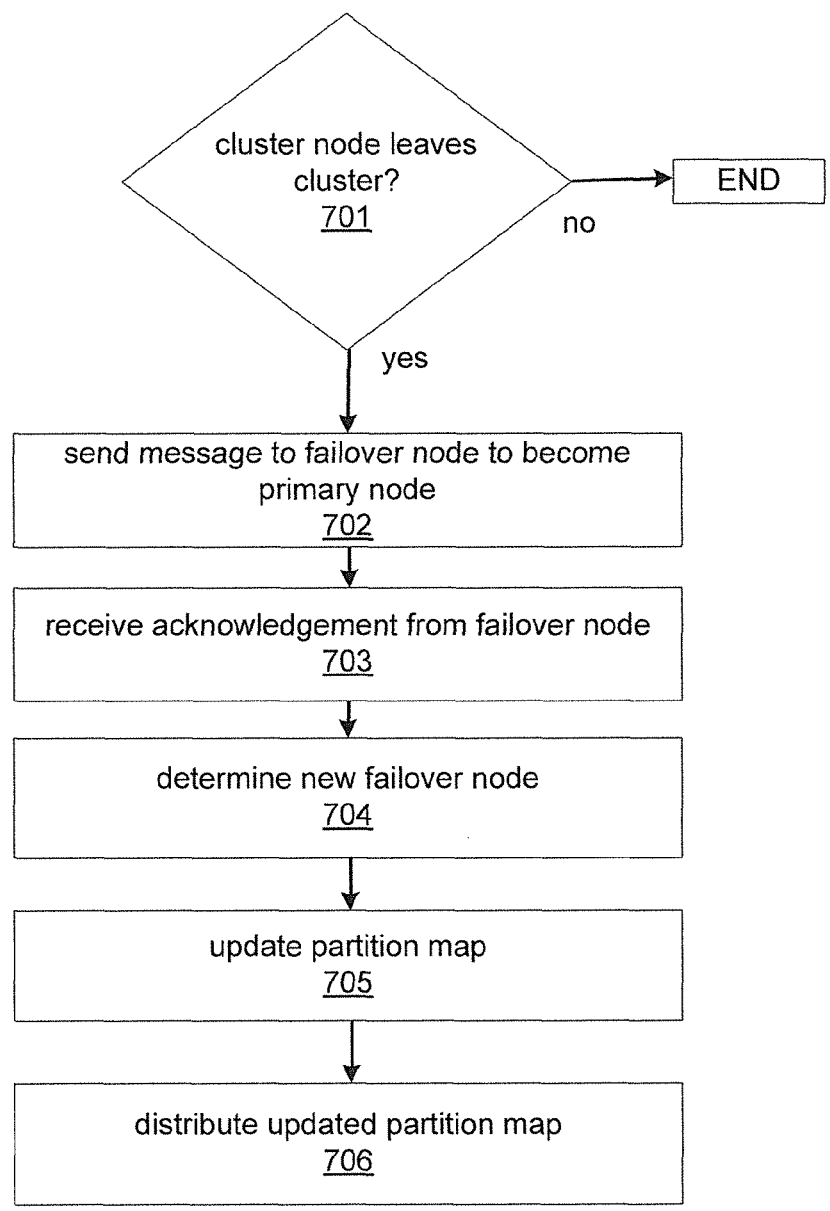
FIG. 7 illustrates an example of a method for modifying a cluster when a cluster node leaves a cluster.

Method 700 shown in FIG. 7 describes modifying cluster membership to include a new cluster node. At 701, the master node 110 determines whether a cluster node leaves the cluster 120 (either planned or unplanned). For example, the master node 110 may determine that a cluster node failed or otherwise has been removed from the cluster 120.

At 702, the master node 110 sends a message to the failover node for the cluster node that left the cluster 120 to become the primary node for the partition of the cluster node that left the cluster 120. For example, the failover node loads the corresponding application data for the partition into memory from the data storage 111 if it is not already stored in memory. The failover node restores the aggregation state from the last received checkpoint, and may check any new events received for the partition since the last checkpoint to determine whether there are any partial matches for the rules for the cluster node.

At 703, the master node 110 receives an acknowledgement from the failover node that it has completed its restoration process and is now operating as the primary cluster node for the partition.

At 704, a new failover node is determined for the new primary cluster node. The master node 110 updates the partition map to identify the new failover node at 705, and the master node 110 distributes the updated partition map to the cluster nodes 121*a-n* and the new cluster node at 706.

Figure 8:
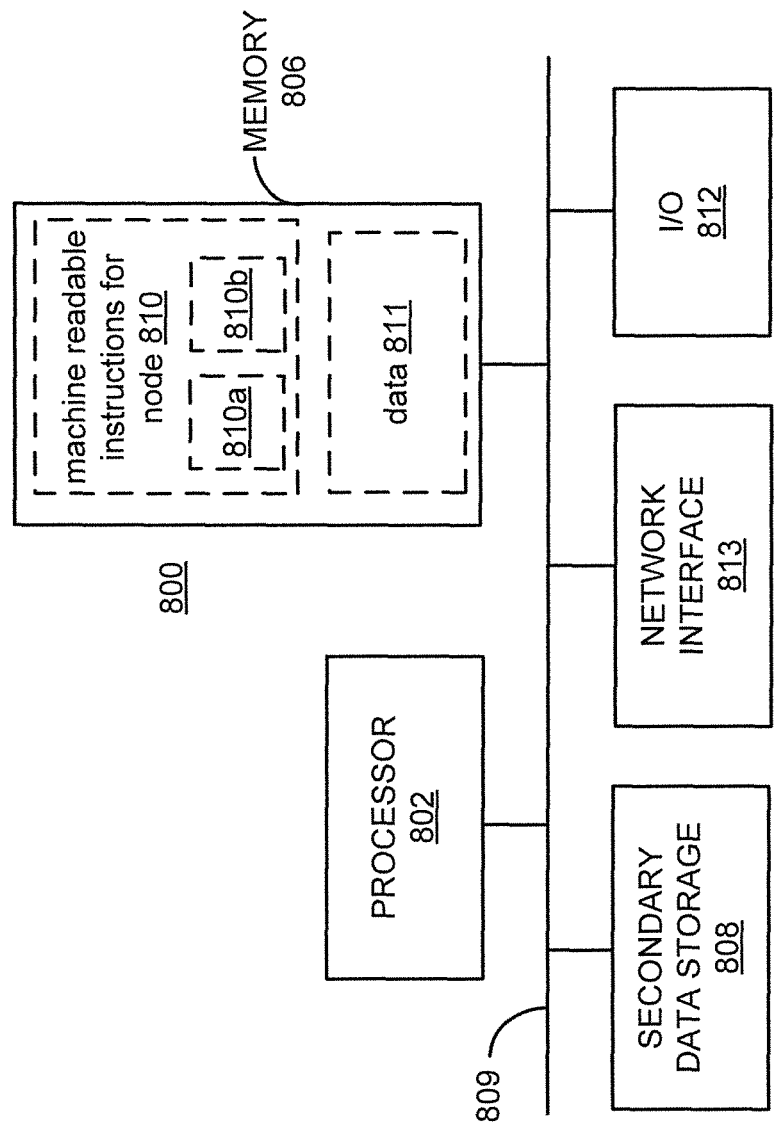
FIG. 8 illustrates an example of a computer system that may be used as a platform for the nodes in the distributed event correlation system.

FIG. 8 shows a computer system 800 that may be used with the embodiments and examples described herein. The computer system 800 is a platform that may be used for the master node 110, any of the cluster nodes in the cluster 120 and/or for the RD node 130. The computer system 800 may execute, by one or more processors or other hardware processing circuits, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 800 includes at least one processor 802 that may execute machine readable instructions performing some or all of the methods, functions and other processes described herein. The computer system 800 also includes data storage. The data storage may include memory 806, such as random access memory (RAM). For example, machine readable instructions 810 for the node may reside in the memory 806 during runtime. The machine readable instructions 810 may perform one or more of the methods and other functions for the node described above. For example, the machine readable instructions 810 may include event correlation instructions 810*a* executed by a cluster node to determine whether conditions for a rule are satisfied or cluster management and event routing instructions 810*b* executed by the master node 110 to manage clusters and route events. Also, data 811 for the node may reside in the memory 806. The data 811 may include any information used by the node. In one example, the data 811 includes application data if the computer system 800 is for a cluster node. The data 811 may include event data for recently received events routed to the node by the master node 110. The data 811 may include a partition map. The data 811 may include rules and/or a checkpoint. The computer system 800 may include a secondary data storage 808, which may be non-volatile and stores the machine readable instructions 810 and any other information used by the node which may also be stored in the memory 806. Commands and data from the processor 802 are communicated over a communication bus 809. The computer system 800 may include an I/O device 812, such as a keyboard, a mouse, a display, etc. The computer system 800 may include a network interface 813 for connecting to a network. Other known electronic components may be added or substituted in the computer system 800 and the computer system 800 may not include all the components shown in FIG. 8.

While the embodiments have been described with reference to examples, various modifications to the described embodiments may be made without departing from the scope of the claimed features.

What is claimed is:

1. A master node in a distributed event correlation system including cluster nodes in a cluster, the master node comprising:
   at least one processor to:
      divide an event field in events into partitions including ordered contiguous blocks of values for the event field;
      assign each partition to a pair of the cluster nodes;
      determine a partition map from the partitions, wherein the partition map identifies for each partition, the block of the event field values for the partition, a primary cluster node, and a failover cluster node for the primary cluster node; and
   a data storage to store the partition map, wherein the at least one processor is to store the partition map in the data storage.

2. The master node of claim 1, wherein the at least one processor is to:
   receive an event from a data source;
   extract a value for the event field from the event;
   determine whether the extracted value is a non-null value;
   if the extracted value is non-null, identify a corresponding cluster node for the received event based on the block in which the extracted value is located; and
   send the event to the corresponding cluster node.

3. The master node of claim 2, wherein the at least one processor is to:
   if the extracted value is null, send the event to an independent cluster node, wherein the independent cluster node is not assigned to any of the contiguous blocks of values for the event field and is to correlate received events according an event rule.

4. The master node of claim 1, wherein the at least one processor is to:
  determine whether a new cluster node is joining the cluster;
  if the new cluster node is joining the cluster, assign a portion of the contiguous blocks of event field values to the new cluster node; and
  update the partition map to include the new cluster node and its partition and its failover cluster node and to include any changes to the partitions as a result of the assigning of the portion of the contiguous blocks of event field values to the new cluster node.

5. The master node of claim 4, wherein the new cluster node loads application data for its partition from an event correlation system data storage storing events for the distributed event correlation system.

6. The master node of claim 1, wherein the at least one processor is to:
  determine whether a primary cluster node leaves the cluster;
  if a primary cluster node leaves the cluster, send a message to the failover cluster node for the primary cluster node that left the cluster to become a new primary cluster node for the partition of the primary cluster node; and
  update the partition map to include the failover cluster node as the new primary cluster node for the partition and to include a new failover cluster node for the new primary cluster node.

7. The master node of claim 6, wherein the failover cluster node restores an aggregation state from a last received checkpoint, and loads application data for the partition from an event correlation system data storage storing application data for the distributed event correlation system.

8. The master node of claim 1, wherein the at least one processor is to:
  distribute the partition map to the cluster nodes;
  update the partition map in response to changes in the cluster; and
  distribute the updated partition map to the cluster nodes.

9. A cluster node of a plurality of cluster nodes in a distributed event correlation system storing partitions of event data, the cluster node comprising:
  data storage to store events received for a partition for the cluster node; and
  at least one processor to
    receive a rule for correlating events, wherein events are to be aggregated to determine whether a condition in the rule is satisfied;
    receive an event for the partition;
    determine whether the event is a partial match for the rule, wherein the partial match includes a partial satisfaction of the condition;
    if the event is a partial match, determines whether the rule is a partition-independent rule or a partitioned rule;
    if the rule is a partition-independent rule, send information for the partial match to a rule designated node to aggregate events to determine whether the condition is satisfied; and
    if the rule is a partitioned rule, the event is stored at the cluster node as a partial match and events are aggregated at the cluster node to determine whether the condition is satisfied.

10. The cluster node of claim 9, wherein if the rule is the partition-independent rule, the rule designated node receives information for partial matches from multiple cluster nodes to aggregate events to determine whether the condition is satisfied.

11. The cluster node of claim 9, wherein the at least one processor is to:
  store and update an aggregation state, wherein the aggregation state includes information for the partial matches for the rule; and
  send a checkpoint to a failover node for the cluster node, wherein the checkpoint includes the aggregation state and information for events recently received for the partition of the cluster node.

12. The cluster node of claim 9, wherein the at least one processor is to receive a partition map determined by a master node in the distributed event correlation system and store the partition map in the data storage, wherein the master node is to divide an event field in events into the partitions including ordered contiguous blocks of values for an event field, and the partition map identifies for each partition, a block of event field values for the partition, a primary cluster node, and a failover cluster node for the primary cluster node.

13. The cluster node of claim 12, wherein the cluster node is to receive incoming events for the partition from the master node, wherein the master node, for each incoming event is to extract a value for the event field from the event, identify a corresponding cluster node for the received event based on the block in which the extracted value is located; and send the event to the corresponding cluster node.

14. A non-transitory computer readable medium including machine readable instructions executable by at least one processor to:
  divide an event field in events into partitions including ordered contiguous blocks of values for the event field;
  assign each partition to a pair of cluster nodes in a distributed event correlation system;
  determine a partition map from the partitions, wherein the partition map identifies for each partition, the block of the event field values for the partition, a primary cluster node, and a failover cluster node for the primary cluster node; and
  store the partition map,
  wherein each of the cluster nodes are to correlate events received from the master node based on a rule, where the correlation includes:
    receiving an event for the partition;
    determining whether the event is a partial match for the rule, wherein the partial match includes a partial satisfaction of the condition;
    if the event is a partial match, determining whether the rule is a partition-independent rule or a partitioned rule;
    if the rule is a partition-independent rule, sending information for the partial match to a rule designated node to aggregate events to determine whether the condition is satisfied; and
    if the rule is a partitioned rule, storing the event at the cluster node as a partial match and aggregating events at the cluster node to determine whether the condition is satisfied.

15. A master node in a distributed event correlation system including cluster nodes in a cluster, the master node comprising:
  at least one processor to:
    divide an event field in events into partitions including ordered contiguous blocks of values for the event field;

assign each partition to a pair of the cluster nodes;
determine a partition map from the partitions, wherein the partition map identifies for each partition, the block of the event field values for the partition, a primary cluster node, and a failover cluster node for the primary cluster node; and
a data storage to store the partition map, wherein the at least one processor is to store the partition map in the data storage,
wherein each of the cluster nodes are to correlate events received from the master node based on a rule, where the correlation includes:
receiving an event for the partition;
determining whether the event is a partial match for the rule, wherein the partial match includes a partial satisfaction of the condition;
if the event is a partial match, determining whether the rule is a partition-independent rule or a partitioned rule;
if the rule is a partition-independent rule, sending information for the partial match to a rule designated node to aggregate events to determine whether the condition is satisfied; and
if the rule is a partitioned rule, storing the event at the cluster node as a partial match and aggregating events at the cluster node to determine whether the condition is satisfied.

16. The master node of claim 15, wherein the at least one processor is to:
receive an event from a data source;
extract a value for the event field from the event;
determine whether the extracted value is a non-null value;
if the extracted value is non-null, identify a corresponding cluster node for the received event based on the block in which the extracted value is located; and
send the event to the corresponding cluster node.

17. The master node of claim 15, wherein the at least one processor is to:
if the extracted value is null, send the event to an independent cluster node, wherein the independent cluster node is not assigned to any of the contiguous blocks of values for the event field and is to correlate received events according an event rule.

18. The master node of claim 15, wherein the at least one processor is to:
determine whether a new cluster node is joining the cluster;
if the new cluster node is joining the cluster, assign a portion of the contiguous blocks of event field values to the new cluster node; and
update the partition map to include the new cluster node and its partition and its failover cluster node and to include any changes to the partitions as a result of the assigning of the portion of the contiguous blocks of event field values to the new cluster node.

19. The master node of claim 18, wherein the new cluster node loads application data for its partition from an event correlation system data storage storing events for the distributed event correlation system.

* * * * *